No. 868,216.
PATENTED OCT. 15, 1907.
W. D. McNAULL.
CUSHION TIRE.
APPLICATION FILED SEPT. 1, 1906.
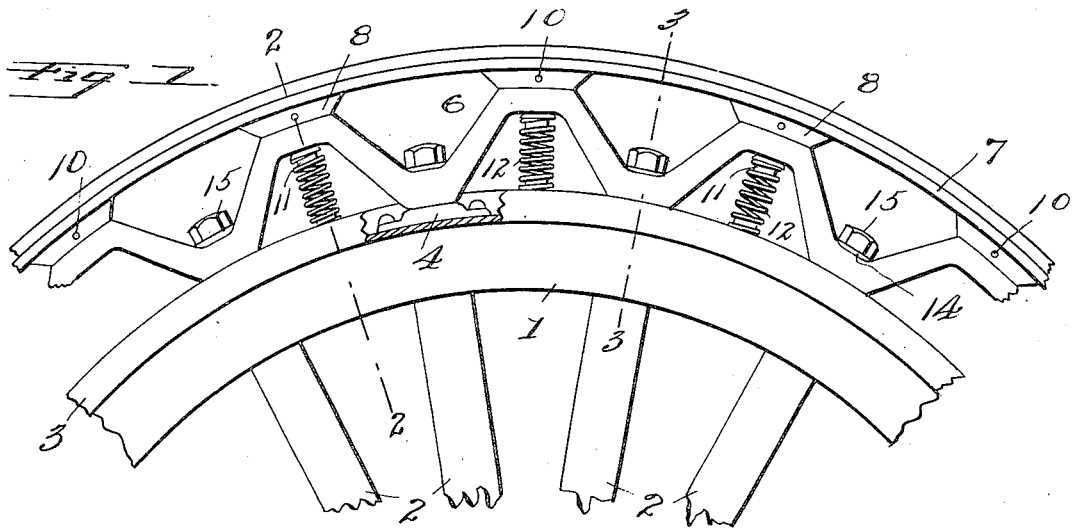
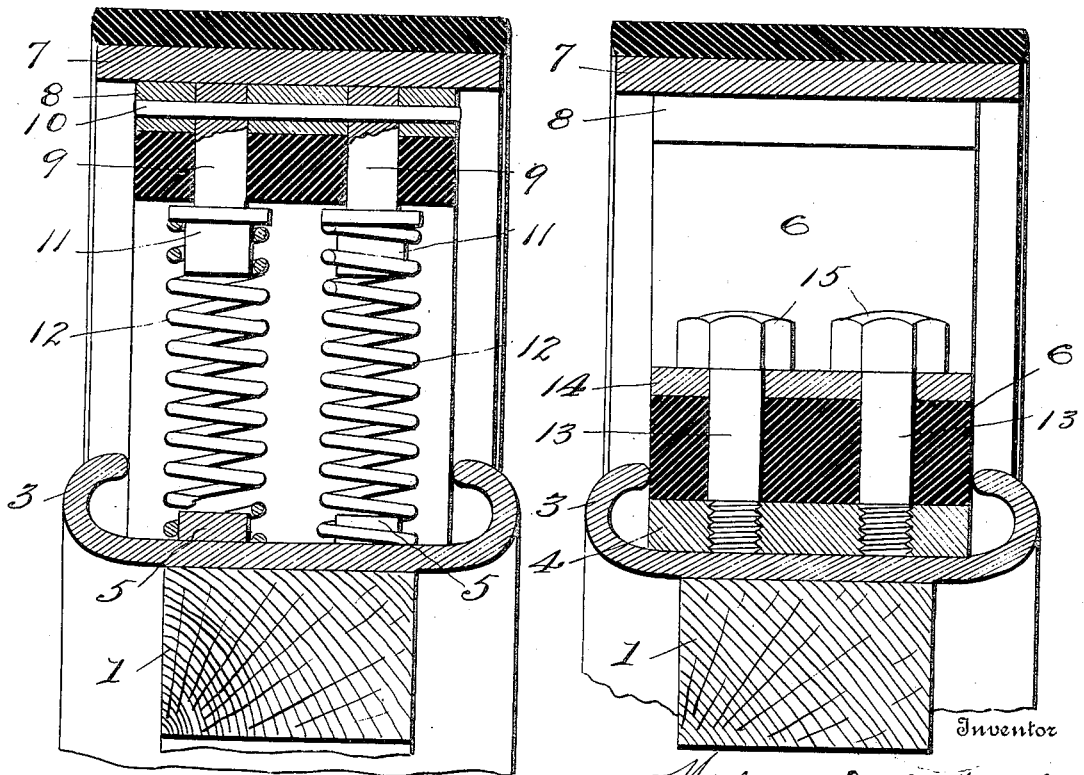
Witnesses
Chas. K. Davies
W. L. Shipley
Inventor
William D. McNaull
By Bartlett & Brock
Attorneys

UNITED STATES PATENT OFFICE.

WILLIAM D. McNAULL, OF TOLEDO, OHIO.

CUSHION-TIRE.

No. 868,216.  Specification of Letters Patent.  Patented Oct. 15, 1907.

Application filed September 1, 1906. Serial No. 333,012.

*To all whom it may concern:*

Be it known that I, WILLIAM D. McNAULL, a citizen of the United States, and a resident of Toledo, in the county of Lucas and State of Ohio, have invented a new and useful Improvement in Cushion-Tires, of which the following is a specification.

My present invention relates to cushion tires and, while admirably adaptable for automobiles, may be used on any vehicle.

The invention consists in the following construction, combination, and arrangement of the parts, the details of which will first be fully described and the features of novelty then set forth and claimed.

Figure 1 represents a side view of an outer portion of a wheel having my improvements applied thereto; Fig. 2 is a transverse section taken on the line 2—2; and Fig. 3 is a transverse section taken on the line 3—3, both of Fig. 1.

In the drawings 1 represents the felly of a vehicle wheel; 2 are the spokes. In the particular exemplification of my invention I have shown it applied to the standard clencher rim of an automobile wheel. 3 represents a clencher rim; 4 are plates bolted to the base of the rim and carrying sockets and bearing faces for the resilient rubber portion of the tire; 5 are retaining studs for the metallic spring portions of the tire. The plates 4 and studs 5 are preferably alternately and equally spaced about the circumference of the wheel.

6 is a corrugated band of molded rubber passing outwardly from the clencher rim 3 to the outer rim or tire, and hence inwardly and outwardly alternately, as shown in the drawings, the function of which will be hereafter described.

7 is preferably a steel tire having at points radially opposite the studs 5 a series of bearing blocks 8 similar to the plates 4 on the inner rim. The outer rim 7 may be provided with an outer facing of leather, hard rubber, or the like, or with any anti-skidding attachment thereto.

9 are pins which are socketed and securely held in the blocks 8 by a fastening device, as pins 10. These pins 9 are preferably used in pairs arranged in a line at right angles to the length of the tire and project through openings in the rubber corrugated cushion, the inner ends of the pins being provided with collared studs 11 which serve as bearings for the ends of the metallic springs opposite studs 5.

12 are the metallic springs socketed in studs 5 and 11, preferably in pairs and of the coiled variety; 13 are bolts, also preferably in pairs, secured to the blocks 4 on the clencher rim. These bolts pass through the continuous rubber cushion 6 at the inward bends of the same and hold the cushion in place by means, preferably, of a washer 14 and nut 15.

It will be noticed that the continuous corrugated rubber cushion band is nearly as wide as the width of the tire in the present exemplification. Its width and thickness, in short, its general dimensions, can be varied, as will be obvious. The cushion is alternately bolted to the inner rim 3 by blocks 4, and to the outer rims 7 by blocks 8, which blocks present a fair and free bearing which does not have any tendency to cut the rubber at those points. Supporting the rubber cushion at its outer bends next to blocks 8 are additional metallic springs 12 which serve to give the proper stability and resiliency to the tire under varied load conditions.

In addition, should it be desired, similar springs 12 may be socketed upon the outer ends of pins 13 and project radially into proper bearings upon the inner faces of the outer rim 7.

While the invention is shown in connection with a clencher rim tire it is obvious that the invention is adapted to the ordinary felly of any wheel, whether provided with the ordinary or a special tire.

The pins take the thrust from the metallic springs and transmit it to the rim without bringing any wear or pressure upon the rubber at those points. In a tire of this character the weight of the load is transmitted throughout the entire circumference of the cushion including the top and sides in equalizing the load and pressure.

While the invention has been described in connection with the accompanying drawings, yet it will be understood that the improvements are not confined to the details illustrated and described and are capable of modification within the scope of the claims.

It will be noted that the rubber cushioning band makes an elastic connection between the outer tire and the wheel proper which yields somewhat under load and driving impulse so that the strain conveyed to the bearings and engine in starting a car with rigid wheels is very much alleviated. When starting a car to which my invention is applied, for instance, when the clutch is engaged the rubber strip permits the wheel proper to move an appreciable distance (limited by the amount of give of which the rubber is capable) before the impulse is communicated to the outer tire.

What I claim is

1. In a wheel, the combination of an inner rim, an outer rim, a strip of flexible material between the rims, secured to the inner and outer rims at alternate points, blocks on the inner rim against which the strip rests, bolts passing through the strip and engaging the blocks on the inner rim, studs passing through the strip and engaging sockets in the blocks on the outer rim, and pins passing through the blocks and holding the studs in position.

2. In a wheel, the combination of an inner rim, an outer rim, a strip of flexible material between the rims, secured to the inner and outer rims at alternate points, blocks on the inner rim against which the strip rests, bolts passing through the strip and engaging the blocks on the inner rim, studs passing through the strip and engaging sockets in blocks on the outer rim, pins passing through the blocks and holding the studs in position, spring seats formed on the studs, spring seats formed on the inner rim, and helical springs interposed between the rims and held in place by the spring seats.

In testimony whereof I have affixed my signature in the presence of two witnesses.

WILLIAM D. McNAULL.

Witnesses:
D. HARRY HARPSTER,
ERNEST CONRAD.